United States Patent [19]
Martin

[11] 3,933,292
[45] Jan. 20, 1976

[54] APPARATUS FOR WELDING
[76] Inventor: Marion A. Martin, 2055 Woodcrest, Baton Rouge, La. 70814
[22] Filed: Feb. 24, 1975
[21] Appl. No.: 552,279

[52] U.S. Cl. .................... 228/49; 228/212; 228/213
[51] Int. Cl.² .......................................... B23K 37/04
[58] Field of Search ........ 228/49, 50, 4.1, 212, 213, 228/216

[56] References Cited
UNITED STATES PATENTS
| | | | |
|---|---|---|---|
| 1,774,386 | 8/1930 | Lard | 228/212 X |
| 1,902,051 | 3/1933 | Wall | 228/50 X |
| 3,571,908 | 3/1971 | Pilia | 228/50 X |
| 3,803,703 | 4/1974 | Montgomery | 228/50 X |

Primary Examiner—James L. Jones, Jr.
Assistant Examiner—Margaret M. Joyce
Attorney, Agent, or Firm—William David Kiesel

[57] ABSTRACT

A guide useful in welding large objects such as offshore oil rig support structures, is described as having a guide jacket with appropriate openings for the positioning of jacks and their support structures.

13 Claims, 6 Drawing Figures

FIG. I.

APPARATUS FOR WELDING

BACKGROUND OF THE INVENTION

1. Field of the Invention

This invention relates to apparatus and procedures for welding large objects, and more particularly, to an apparatus and procedure for welding structural support pipe used in offshore oil rigs.

2. Prior Art.

In present day petroleum practice, offshore oil rigs have support structural members which are formed, in many cases, from metal pilings welded end to end. Because of the size and weight of these pilings, it is difficult to perform a proper welding when the two ends of the pilings meet. In many cases, it is difficult to hold the ends in place during the welding process due to the rocking motion of the crane barges holding the piling in position. This is particularly true in rough seas.

SUMMARY OF THE INVENTION

It is an object of this invention to provide a device for holding two piling joints securely in position for welding.

It is another object of this invention to provide a process for welding two piling joints together.

Other objects and advantages of this invention will become apparent from a reading of the hereinbelow descriptions of the invention.

Accordingly, an apparatus for holding two objects adjacent to one another in position for welding is provided having an outer jacket which fits about a portion of both objects, the jacket being provided with a welding opening through which one can weld the two objects together, a top jack assembly attached to the jacket and a bottom jack assembly attached to the jacket, which assemblies fit about the objects to hold the objects securely against the jacket.

In another aspect of the invention, a process for welding two adjacent objects is provided comprising the steps of placing the jacket over the first object in a position whereby the welding opening exposes a portion of the area to be welded, securing the first object to the jacket by compressing the bottom jack assembly located about the first object, passing the second object into the jacket and into contact with the first object at a position where it is to be welded, securing the second object to the jacket in this position by compressing top jack assembly located about the second object, welding that area exposed through welding opening, loosening the jacket from the objects partially welded together and removing it from the objects, and complete welding the areas desired to be welded.

PREFERRED EMBODIMENTS OF THE INVENTION

Figure 1:
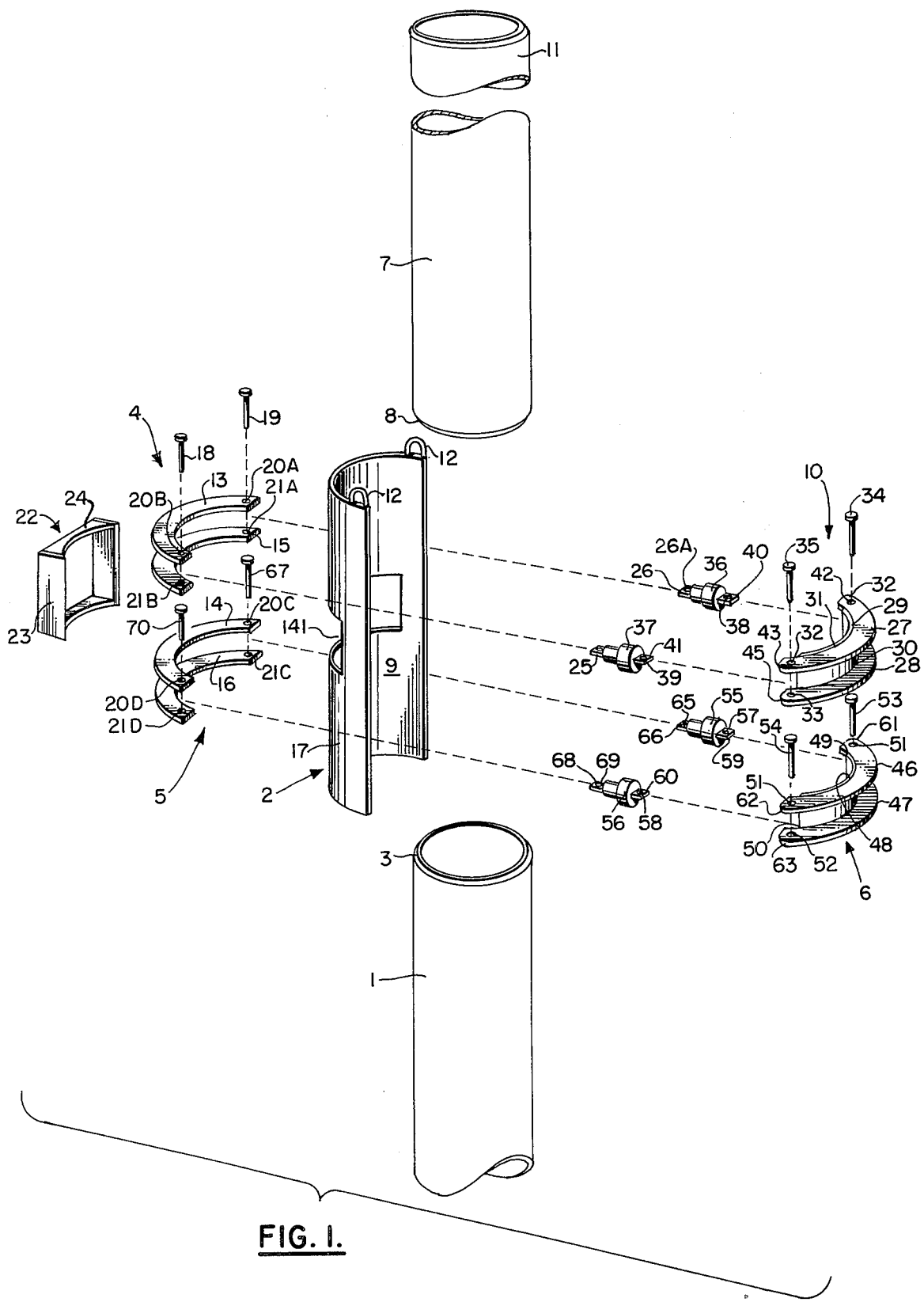
FIG. 1 is an exploded, perspective view of one embodiment of the invention.

Without limiting the scope of the invention, the preferred features of this invention will be described using an apparatus specifically designed to assist welding of offshore oil rig leg support structures.

In a typical offshore oil rig leg support structure, larger welded pilings are the basic component. These individual pilings may be from thirty to ninety feet long, three feet in diameter and weigh up to thirty tons. Because of the size and weight of these pilings, handling and positioning of them is quite a problem. To accomplish the handling of the pipe, barges are brought to the site with various piling crane handling apparatus. Since the barges are floating platforms, positioning of these pilings becomes extremely difficult in rough seas. To assist the positioning of these pilings for welding, a welding guide jacket means, such as seen in FIG. 1, may be used.

In general terms, in one embodiment of this invention, the first or ground piling 1 is driven into the water bottom at the desired location. Once piling 1 has been driven into position, welding jacket 2 is placed about piling 1 in a position where piling end 3 is located between the upper jack brace assembly 4 and the lower jack brace assembly 5. Piling 1 is then secured to welding jacket 2 by the hinged lower jack assembly 6. After piling 1 has been secured to welding jacket 2, the second piling 7 is placed with its end 8 to be welded adjacent to piling end 3, and within the concave cavity 9 of jacket 2. Piling 7 is then held securely in this position by the hinged upper jack assembly 10. Since jacket 2 is designed not to completely wrap around piling 1 and 7 at the area where they are to be welded, the pilings can be partially welded together once they have been secured by the jack assemblies. Upon completion of the partial welding, the lower and upper jack assemblies 6 and 10, respectively, are loosened so jacket 2 can be rotated about the partially welded pilings in order to expose the remainder of the area to be welded. Once the remainder of the welding is done, the above process can be repeated with a third piling (not shown) being welded to piling end 11 if desired.

In a preferred feature, jacket 2 will be provided with handles 12 to which cables from a barge crane can be attached to move jacket 2 about piling 1 in the initial positioning.

Figure 2:
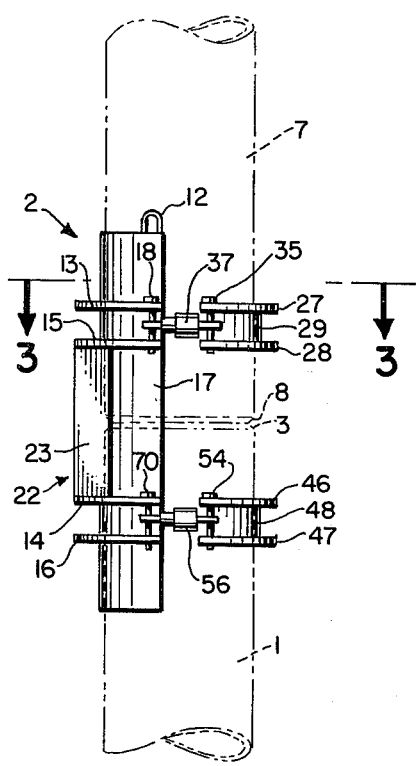
FIG. 2 is a side view of FIG. 1 illustrating one employment of the jack assemblies on the jacket and arount the piling.
Figure 3:
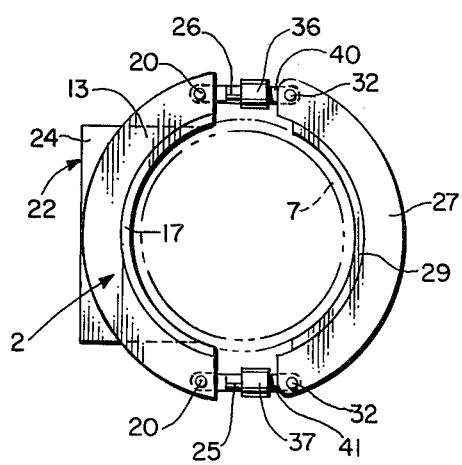
FIG. 3 is a cross-sectional view taken along lines 3-3 of FIG. 2 when securing the piling to the jacket.
Figure 5:
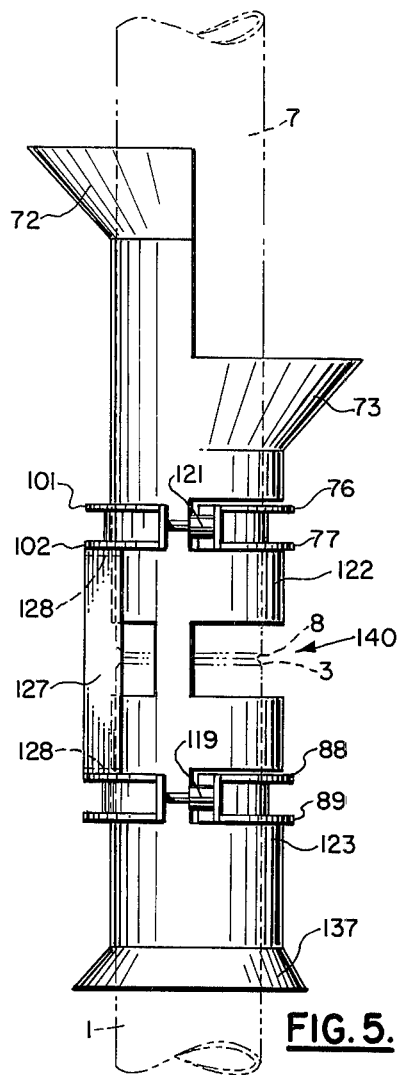
FIG. 5 is a side view of FIG. 4.

As can be seen more clearly in FIGS. 1–3, the jack brace assemblies 4 and 5 will each comprise top ribs 13 and 14, respectively, and bottom ribs 15 and 16, respectively, welded to the outer surface 17 of jacket 2. The top and bottom ribs of upper jack brace assembly 4 will be separated from one another to allow the hinge bars 25 and 26 of the upper jack assembly 10 to pivot about either pin 18 or pin 19 which are positioned through openings 20 and 21 in the top and bottom ribs, respectively. In a more preferred feature, the jack brace assemblies 4 and 5 will be provided with a vertical support rib 22 which comprises vertical plates 23 and horizontal plates 24 welded perpendicularly together and then welded to the bottom rib 15 and top rib 14 of the jack brace assemblies.

In a preferred embodiment upper jack assembly 10 will comprise a top rib 27 and bottom rib 28 connected to the top rib 27 by a support rib 29 welded to the inside perimeter of bottom rib side wall 30 and the inside perimeter of top rib side wall 31. Top rib 27 and bottom rib 28 are provided with an aligned pair of openings 32 and 33, through which pins 34 and 35 are inserted to hold jacks 36 and 37 in hinge bars 40 and 41 attached to jacks 36 and 37. In a more preferred feature, top rib 27 and bottom rib 28 are provided with rounded shoulder sections 42, 43, 44 and 45 that permit the ribs to pivot more freely about either pin 34 or pin 35 as desired when top rib 27 in in close proximity to top rib 13.

The lower jack assembly 6 will be similar in construction to the upper jack assembly 10. It too will comprise a top rib 46, a bottom rib 47 connected to top rib 46, by a support rib 48 welded to top rib side wall 49 and bottom rib side wall 50 as before. Similarly, top rib 46 and bottom rib 47 are provided with a pair of aligned openings 51 and 52 through which pins 53 and 54 are inserted to hold jacks 55 and 56 in position by also passing as shown through openings 57 and 58 in hinge bars 59 and 60 attached to jacks 55 and 56. As in the upper jack assembly 10 top rib 46 and bottom rib 47 are preferably provided with rounded shoulder sections 61, 62, 63 and 64 that permit the ribs to pivot freely about either pin 53 or 54 as desired, when top rib 46 is in close proximity to top rib 13.

In the pivoting jack assembly arrangement described above, jacket 2 is positioned about piling 1 with the jack assemblies 6 and 10 attached to jacket 2 by connecting one side of each jack assembly to the jacket. For example, top jacket assembly 10 is connected to jacket 2 by positioning hinge bar 26 between top rib 13 and bottom rib 15 whereby opening 26A is aligned with openings 20A and 20B and pin 19 inserted therethrough. In like manner, hinge bar 65 of jack 55 is inserted between top rib 14 and bottom rib 16 whereby opening 66 is aligned with openings 20C and 21C and pin 67 inserted therethrough. In this position, the jack assemblies are pivoted about pins 19 and 67 to fully expose cavity 9 so that jacket cavity 9 can be positioned adjacent to piling 1 without interference from the jack assemblies. It is, of course, obvious that jacket cavity 9 could be positioned and then the jack assemblies connected as described above.

With the jacket positioned and at least the bottom jack assembly 6 attached to jacket 2 as described above, jack assembly 6 is pivoted on pin 67 until support rib 48 is adjacent to piling 1. In this position, opening 68 of hinge bar 69 can be inserted between top rib 14 and bottom rib 16 and in alignment with openings 20D and 21D. Pin 70 is then inserted through the three aligned openings to hold jack assembly 6 about piling 1. Jacks 55 and 56 are then compressed to tighten jack assembly 6 around piling 1 in order to hold the jacket securely in position about piling 1.

As described before, the next step in the procedure is to position piling 7 in cavity 9 with piling end 3. Once piling 7 is in cavity 9, upper jack assembly 10 is pivoted around piling 7 and secured to jacket 2 in a manner similar to that done to the lower jack assembly. Jacks 36 and 37 are then compressed to securely position piling 7 whereby it can be welded.

When welding structures such as the piling illustrated above, it is preferred that all jacks have a compressible force rating of 100 tons or more, and in jacks 55 and 56, it is more preferred if these jacks have a compressible force rating of 200 tons or more.

Hydraulic water or other fluid jacks of conventional nature may be used in the apparatus of this invention.

In another preferred embodiment, jacket 2 can be provided with a second welding opening 141 located at a position piling ends 3 and 8 meet. With this feature, the pilings can be sufficiently welded so that it is not necessary to rotate jacket 2 but rather allows jacket 2 to be removed in order to complete the welding.

Figure 4:
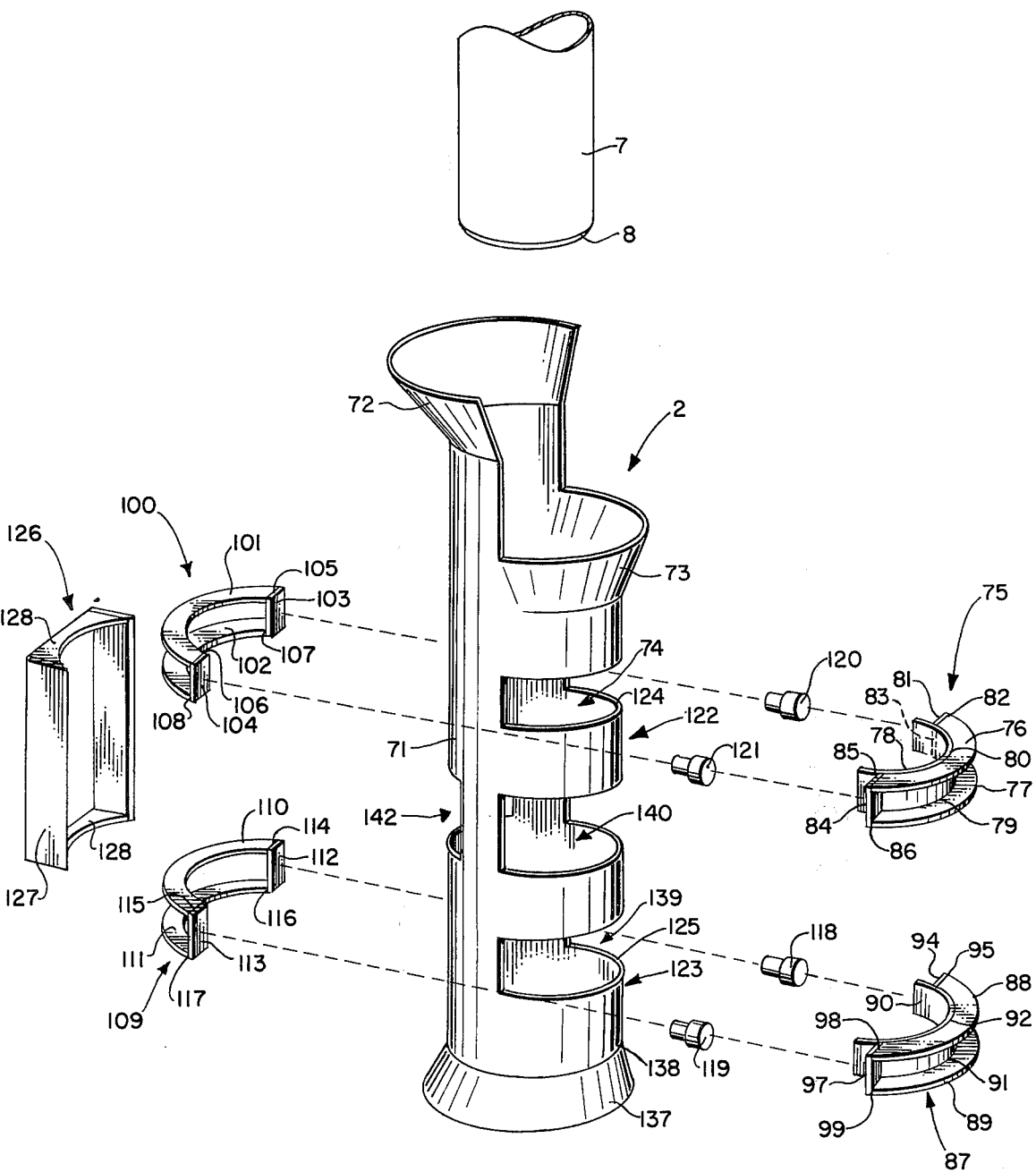
FIG. 4 is an exploded perspective view of another embodiment of this invention.

In another preferred embodiment, as seen in FIG. 4, jacket 2 will comprise a hollow body member 71 that is fitted with a top lip 72 that extends outward and upward from the body 71 a portion of the distance around the top of body 71. Around the remaining top body 71 is a second top lip 73 which is located below lip 72. These lips aid in the initial insertion of pilings into the jacket when the pilings are being guided principally by the barge cranes. Below lower lip 73 is a first opening 74 that extends partially around hollow body member 71. This allows the top jack assembly 75 which fits about jacket 2 and in opening 74 to contact piling and securely position it as described below. As more clearly seen in FIGS. 4 adn 5, the top jack assembly 75 is similar to the jack assemblies previously described in that it comprises a top rib 76 and a bottom rib 77 connected to the top rib 76 by a support rib 78 welded to the inside perimeter of bottom rib side wall 79 and the inside perimeter of top rib side wall 80. Top jack assembly 75 is also provided with a jack connecting wall member 81, attached to top rib wall surface 82 and bottom rib wall surface 83 and with jack connecting wall member 84 attached to top rib wall surface 85, and bottom rib wall surface 86. Likewise, lower jack assembly 87 comprises a top rib 88 and a botton rib 89 connected to the top rib 88 by a support rib 90 welded to the inside perimeters of bottom rib side wall 91 and top rib side wall 92. Also, lower jack assembly 87 is also provided with a jack connecting wall member 94 attached top to rib wall surface 95 and bottom rib wall surface 96, and with jack connecting wall member 97 attached to top rib wall surface 98 and bottom rib wall surface 99.

Jacket 2 is further provided with a second opening 139 that is located below first opening 74. Second opening 139 also extends partially around jacket 2. Between the two openings is welding opening 140. The welding opening extends partially around jacket 2 and is a sufficient size to permit the partial welding together of pilings 1 and 7 at their ends 3 and 8, respectively. In a preferred feature, jacket 2 will have a second welding opening 142 located opposite welding opening 140 and exposing more of the area to be welded. With this feature, the pilings can be sufficiently welded so that it is not necessary to rotate jacket 2, but rather allows jacket 2 to be removed in order to complete the welding.

Jacket 2 will preferably also contain a flared skirt 137 which extends downward and out from the bottom end 138 jacket 2 in order to facilitate the initial positioning of jacket 2 over pipe 1.

Jacket 2 is also similarly provided with an upper jack brace assembly 100 having top rib 101, bottom rib 102 and with jack attaching wall member 103 and 104 connected to top rib wall surfaces 105, 106 and bottom rib wall surfaces 107, 108 as shown. Likewise, lower jack brace assembly 109 has a top rib 110, bottom rib 111 and jack attaching wall members 112 and 113 connected to top rib wall surfaces 114, 115 and bottom rib wall surfaces 116, 117 as shown.

Jacks 118 and 119 are attached to jack attaching wall members 94, 97, respectively, and to jack attaching wall members 112 and 113, respectively, while jacks 120 and 121 are attached to jack attaching wall members 103 and 104, respectively, and to jack attaching wall members 81 and 84, respectively.

In a preferred embodiment, jacket 2 has an upper jack assembly support structure 122, and a lower jack assembly support structure 123. The upper support structure 122 has a lip member 124 that extends underneath upper jack assembly and adjacent to bottom rib 77 on which bottom rib 77 can rest. The lower jack assembly support structure 123 has a lip member 125 that extends underneath lower jack assembly and adjacent to bottom rib 89 on which bottom rib 89 can rest.

In another preferred embodiment, upper jack brace assembly 100 and lower jack brace assembly 109 are given additional structural support by a vertical support rib 126 which comprises vertical plates 127 welded or bolted perpendicularly to horizontal plate 128.

Figure 6:
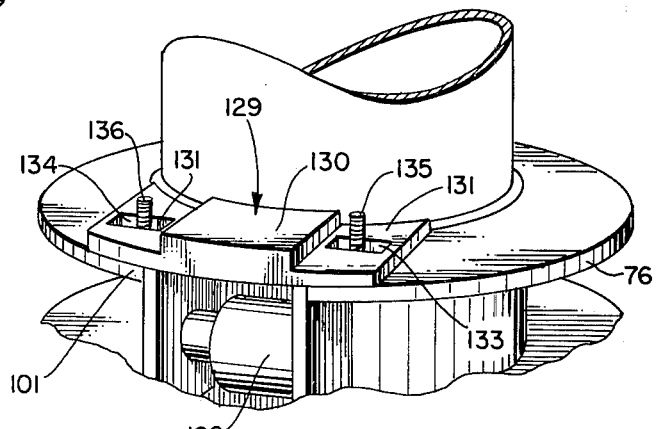
FIG. 6 is a cutaway perspective view of a jack guard that may be employed with this invention to protect the jack from damage by the piling.

In still another preferred feature seen in FIG. 6, a jack protection plate 129 is provided to cover the top of jacks 120 to prevent damage from swinging pilings. Plate 129 comprises a covering section 130 having shoulder sections 131 and 132 provided with opening slots 133 and 134, respectively, through which bolts 135 and 136, respectively, pass. Bolt 135 is attached to top rib 76 of upper jack assembly 75, while bolt 136 is attached to top rib 101 of upper jack brace assembly 100. Opening slots 133 and 134 are of sufficient length to allow for the compressing of jack 120. Similar types of protection plates may be provided for all the jacks.

In addition to the specific embodiments detailed above, there are many obvious alternatives and modifications which fall within the broad scope of this invention.

Having described my invention, what I claim as new, novel, useful and unobvious, and desire United States Letters Patents, is:

1. An apparatus for holding a first and second objects adjacent to one another in position for welding which comprises:
   a. a jacket that fits at least partially about said objects as they are positioned for welding, said jacket being provided with a welding opening through which said objects can be at least partially welded together;
   b. a first securing assembly, capable of being shortened, attached to said jacket and extending around said first object in a position to secure said first object to said jacket when said first securing assembly is shortened; and
   c. a second securing assembly, capable of being shortened, attached to said jacket and extending around said second object in a position to secure said second object to said jacket when said second securing assembly is shortened, said second object being secured adjacent to said first object whereby at least a portion of that area to be welded is accessible through said welding opening.

2. An apparatus according to claim 1 wherein said apparatus comprises handles attached to said jacket.

3. An apparatus according to claim 1 wherein said securing assemblies comprise a jack brace assembly attached to said jacket and a jack assembly connected to said jack brace assembly by a jack.

4. An apparatus according to claim 3 wherein a vertical support rib is positioned between and attached to said jack brace assemblies.

5. An apparatus for holding a first and second metal pilings in an end-to-end position for welding, which comprises:
   a. a jacket that fits parallel to and at least partially around said first and second pilings, said jacket having a welding opening that exposes at least a portion of said adjacent piling ends;
   b. a first securing assembly comprising
      i. a first jack brace assembly attached to said jacket, and
      ii. a first jack assembly connected to said jack brace assembly by a device capable of being shortened, said first jack assembly extending about said first piling in a position to secure said first piling to said jacket when said device is shortened; and
   c. a second securing assembly comprising
      i. a second jack brace assembly attached to said jacket, and
      ii. a second jack assembly connected to said jack brace assembly by a device capable of being shortened, said second jack assembly extending about said second piling in a position to secure said second piling to said jacket in said welding position when said device is shortened.

6. An apparatus according to claim 5 wherein said device is a jack.

7. An apparatus according to claim 6 wherein said jacket has an arc-shaped outer surface and wherein said welding opening extends from said jacket's top to bottom end.

8. An apparatus according to claim 6 wherein
   a. said jack brace assemblies comprise
      i. a top rib attached to said jacket's outer surface
      ii. a bottom rib parallel to said top rib and attached to said jacket's outer surface, said ribs not extending to said jacket's outer surface edges, said top rib having openings on each of its ends that are aligned with openings on said bottom rib's ends;
   b. said jack assemblies comprise
      i. a top jack assembly rib, and
      ii. a bottom jack assembly rib parallel to and attached to said top jack assembly rib by a support rib, said support rib having an arc-shaped surface which contacts said pilings, said support rib extending beyond said jack assembly rib ends, said jack assembly rib ends having aligning openings;
   c. said jacks comprise
      i. a jack brace assembly hinge bar having an opening that can be aligned with said jack brace assembly rib openings, and
      ii. a jack assembly hinge bar having an opening that can be aligned with said jack assembly rib opening; and
   d. pins that are placed through said aligned openings to connect said jacks to said jack brace assemblies and said jack assemblies, said pins capable of being removed from said openings.

9. An apparatus according to claim 5 wherein said jacket comprises a hollow body member having
   a. a top lip extending outward and upward from said body portion of said body's top perimeter
   b. a second top lip located below said top lip extending outward and upward from said body along said body's top perimeter not covered by said top lip, and c. a welding opening located below said second lip and extending partially around said jacket opening up into said body hollow section.

10. An apparatus according to claim 9 wherein said jacket comprises
   a. a first opening located below said second lip and above said welding opening, said first opening being of sufficient size to allow said first jack assembly to enter and make contact with said first piling when said first securing device is shortened, and
   b. a second opening located below said welding opening, said second opening being of sufficient size to allow said second jack assembly to enter and make contact with said second piling when said second securing device is shortened.

11. An apparatus according to claim 10 wherein said jacket comprises:
   a. a first jack assembly support structure located below said first opening and above said welding opening and extending out and underneath said first jack assembly, and
   b. a second jack assembly support structure located below said second opening and extending out and underneath said second jack assembly.

12. An apparatus according to claim 9 wherein said hollow body member is provided with a flared metal skirt at said member's base.

13. An apparatus according to claim 5 wherein said jacket comprises a first and second jack protection plate. Said plates each comprising a covering section attached to said jack brace and expandibly attached to jack assembly, and covering said device's top.

* * * * *